United States Patent [19]
Mickelson

[11] 3,949,524
[45] Apr. 13, 1976

[54] PLANTER

[76] Inventor: Richard C. Mickelson, 623 F. W. Stocker, Glendale, Calif. 91202

[22] Filed: Feb. 25, 1975

[21] Appl. No.: 552,925

[52] U.S. Cl. ..................... 47/34 R; 47/38; 220/306; 206/519; 206/423
[51] Int. Cl.² ..................... A01G 9/02; A01G 9/04
[58] Field of Search ............ 47/38, 34, 38.1, 36, 39, 47/34.2, 38.10, 35; 217/107 B; 220/306; 206/519, 423

[56] References Cited
UNITED STATES PATENTS

| | | | |
|---|---|---|---|
| 964,196 | 7/1910 | Aul | 47/34.2 |
| 1,007,319 | 10/1911 | Williams | 217/36 |
| 1,077,423 | 11/1913 | Myers | 47/35 |
| 2,140,862 | 12/1938 | Sumner | 47/36 |
| 2,504,031 | 4/1950 | Manning | 47/38.1 |
| 2,514,269 | 7/1950 | Wilberschied | 47/38.1 |
| 2,605,588 | 8/1952 | Lindstaedt | 47/35 |

FOREIGN PATENTS OR APPLICATIONS

| | | | |
|---|---|---|---|
| 95,308 | 1/1960 | Norway | 47/34 |
| 324,399 | 11/1957 | Switzerland | 47/38 |
| 289,885 | 10/1965 | Australia | 47/38.1 |
| 453,879 | 12/1949 | Italy | 47/38.10 |
| 542,108 | 11/1955 | Belgium | 47/38.10 |
| 1,148,341 | 12/1957 | France | 47/39 |

*Primary Examiner*—Clyde I. Coughenour
*Assistant Examiner*—James R. Feyrer
*Attorney, Agent, or Firm*—Roger A. Marrs

[57] ABSTRACT

A plant carrier is disclosed herein for holding a plant and its soil which includes an open-ended enclosure having a bottom integrally formed at its peripherial edge with an upwardly projecting continuous sidewall diverging outwardly from the bottom and terminating in a reverse curl so to provide a rounded lip about the top of the sidewall. The bottom further includes a downwardly depending cup-like portion having a plurality of holes or openings formed in the annular sidewall thereof. A dish member carries a plurality of projections detachably engageable with the plurality of openings so that a snap-lock releasable engagement is produced. The cup-like portion and the dish member are provided with a locator system for aligning the snap-lock projections with associated openings.

1 Claim, 4 Drawing Figures

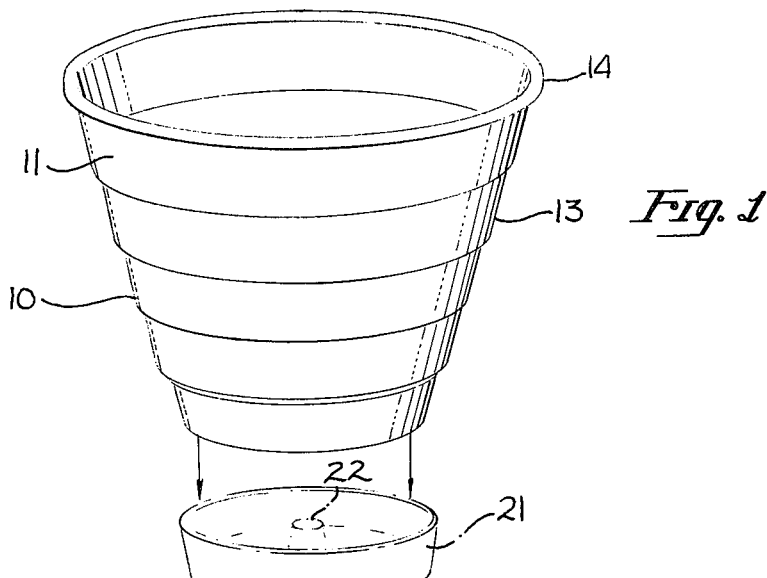
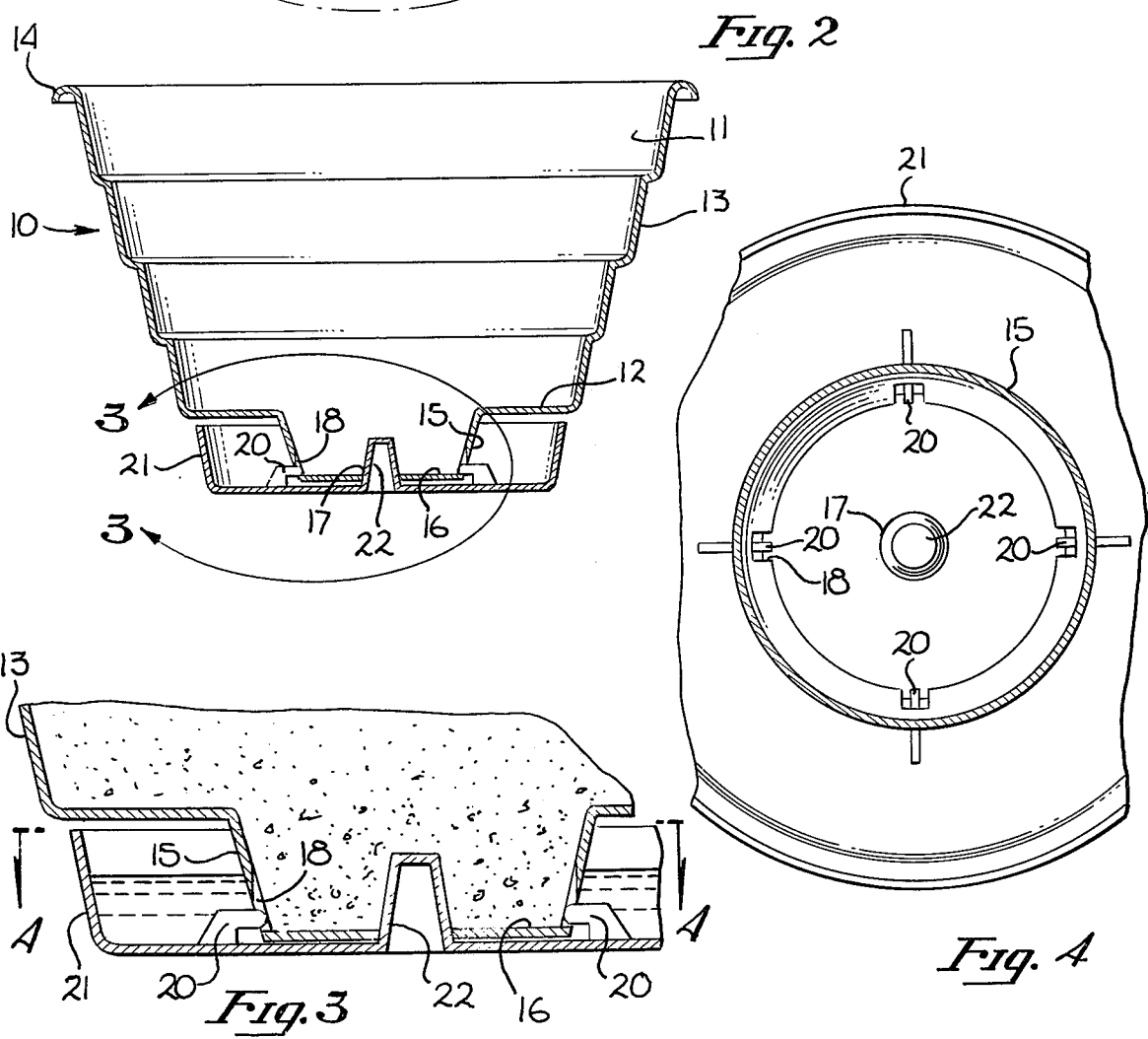

PLANTER

BACKGROUND OF THE INVENTION

1. Field of the Invention

This invention relates to the field of planters and plant carriers for holding a natural growing plant with its life environment in the form of soil and moisture and more particularly to a novel plant carrier of this type having a moisture collection tray which is detachably connected to the underside of the carrier.

2. Brief Description of the Prior Art

In the past, it has been the conventional practice to construct hanging or standing flower planters from wood or metal materials and shaped in such a fashion as to hold the plant and surrounding moist soil. Difficulties have been encountered with these conventional planters which stem largely from the fact that the moisture in the soil progresses to the bottom of the planter and does not evenly distribute throughout the soil or soil mixture. Some attempts have been made to avoid this problem by providing holes in the bottom of the planter and by incorporating an integrally formed tray for collecting the water once it has passed through the soil. However, cleaning of the tray is extremely difficult since it is fixedly attached to the carrier and, in some instances, sufficient water may accummulate in the tray so as to overflow its edges and cause damage to the supporting surface.

Another problem encountered with fixed or integrally formed trays for catching and collecting water resides in the fact that the water cannot be drawn from the tray back into the soil as the soil dries out at upper levels of the carrier. This problem stems largely from the fact that the hole through which the moisture passes from the soil into the tray are raised from the water collection tray so that the water cannot be redrawn back into the soil. In general, it must be born in mind that bench or ground supported planters require drainage means while a suspended or hanging mode of planter employs evaporation process for drainage or moisture control.

Therefore, a need exists for providing a carrier for plants including its life environment which provides moisture control for the life environment soil and at the same time provides a structure which is easy to clean.

SUMMARY OF THE INVENTION

Accordingly, the above difficulties and problems encountered with conventional planters, plant carriers and the like are obviated by the present invention which provides an enclosure for holding a plant in its soil which includes an open-ended enclosure having a bottom integrally formed at is peripheral edge with an upward projecting continuous sidewall that diverges outwardly from the bottom and terminates in a reverse curl. The bottom further includes a downwardly depending cup-like portion having a plurality of openings formed in the annular sidewal thereof. A removable tray or dish member is formed with a plurality of projections that are detachably engageable with a plurality of openings in the cup-like portion so that a snap-lock releasable engagement is produced. The cup-like portion and the tray or dish member are provided with locating means for aligning the snap-lock projections with the associated openings.

Therefore, it is among the primary objects of the present invention to provide a novel plant carrier which includes a removable or detachable water collection tray releasably secured to the bottom of an enclosure or carrier portion.

Another object of the present invention is to provide a novel plant carrier having a cup-like portion downwardly depending from the bottom thereof which includes snap-lock means for releasably coupling a water collection tray thereto.

Still another object of the present invention is to provide a novel plant carrier for a plant in its life environment system whereby moisture may drain into a removable tray and during the evaporation process, the collected water may be drawn back into the soil.

A further object of the present invention is to provide a novel plant carrier having water collection means which is removably connected to the main body of the carrier so that the tray may be cleaned and replaced without difficulty.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view of the novel planter of the present invention and illustrating the detachable dish or tray releasably carried on the bottom thereof;

FIG. 2 is a transverse cross sectional view of the plant carrier shown in FIG. 1 illustrating the detachable connection of the dish or tray to the bottom of the planter;

FIG. 3 is an enlarged fragmentary view, in sections, of the planter as taken in the direction of arrows 3—3 of FIG. 2; and FIG. 4 is a sectional view taken in the direction of arrows 4—4 of FIG. 3.

DESCRIPTION OF THE PREFERRED EMBODIMENT

The novel planter or plant carrier of the present invention is illustrated in the general direction of arrow 10 as shown in FIG. 1 which comprises an enclosure indicated by the numeral 11 which may be downwardly supported from a ceiling hook or eyelet or may be supported on a bench, table or other platform.

As shown more clearly in FIGS. 1 and 2, the enclosure 11 includes a bottom 12 having a peripheral edge which is integrally formed to provide a continuous side wall indicated by numeral 13. It is noted that the side wall is tapered in a diverging manner from the bottom 12 upwardly where the side wall terminates in a reverse curl or lip 14. The curl or lip functions as an integral stiffener about the opening leading into the interior of the enclosure intended to be occupied by soil and the plant.

Bottom 12 includes a downwardly depending cup-like member 15 which is integrally formed with the bottom and provides a cavity into which soil occupies the interior of the planter may be held. The cup-like member 15 includes a bottom panel 16 that is formed with a central opening or hole 17. A plurality of holes are also provided about the wall of the member 15 and is typically illustrated by the numeral 18. The apertures or openings 18 are provided in fixed spaced-apart relationship about the periphery of the member 15 and are intended to receive projections typically illustrated by projection 20 for snap-locking a dish or tray member 21 into place. The tray 21 includes a projection 22 intended to be inserted into the hole 17 for locating purposes with respect to the projections 20 and their associated holes 18. Once the projection 22 is inserted in the hole 17, the tray 21 may be rotated until the projection snap-locks into place with their respective openings in the cup-like member 15.

Referring now in detail to FIG. 3, it can be seen that soil carried in the planter 11 occupies not only the area surrounded by the side wall 13 but occupies the interior of the downward depending cup-like member 15. As water is placed into the soil, the water will penetrate and pass through the opening 18 into the dish or tray 21. The water is illustrated at a high level for illustrious purposes to illustrate that excess water will accummulate in the tray 21. Also, as the soil dries out through the evaporative process, excess water that has been collected by tray 21 will be drawn back through the opening 18 into the soil for nourishing the plant root system. When it is desired to clean the tray, the tray may be removed from the cup-like portion 15 by unsnapping a projection 20 from their respective opening 18 so that separation ensues and the tray may be cleaned. When it is desired to re-attach tray 21 to the bottom of the carrier, projection 22 is inserted through opening 17 and the tray is rotated until the projection 20 aligns with associated and respective openings 18. At this point snap-lock fastening takes place and the tray 21 is attached to the main body of the planter.

Referring now in detail to FIG. 4, it can be seen that the tray 21 as well as the downwardly depending portion 15 are coaxially disposed with respect to each other and that the projection 22 is in the coaxial center for the two members. Also, it can be seen that the projection 20 overlaps the bottom 16 of the downwardly depending portion 15 so that a snap-lock relationship is produced.

In view of the foregoing, it can be seen that the novel plant carrier or planter of the present invention provides a planter having a removable water tray 21 which snap-lock attaches to the other side of the carrier enclosure. The snap-lock relationship is positive and the tray may be readily removed for cleaning purposes. In prior art devices, soil washes into fixed or stationary trays and such trays are difficult to clean. Also, by employing a center locating hole and projection in the tray, alignment of the snap-lock projections with their associated openings is readily achieved. Furthermore, water collected in prior or conventional trays will not draw back up into the soil and experience has shown that if the collection of water is heavy enough, the tray may drop completely from the main plant enclosure. Also, the tray of the present invention need not be used when the main carrier is growing plants in a greenhouse; however, when the carrier is removed from the greenhouse and placed into a store, the tray 21 may be added.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. A plant carrier for holding a growing plant and its life supporting soil comprising:
   an enclosure having a circular bottom of a given diameter and an integral sidewall projecting upward and outward from the peripheral edge of said circular bottom;
   said sidewall terminating at its free end in a reverse curled lip having a rounded peripheral edge defining a central opening leading into the interior of said enclosure;
   said bottom having an integrally formed, downwardly depending cup-like portion including an annular wall and a flat bottom of smaller diameter than said given diameter of said enclosure circular bottom;
   a dish-like tray removably carried on said annular wall of said cup-like portion;
   said tray having a predetermined diameter intermediate said diameters of said enclosure bottom and said cup-like portion bottom so that a uniform upwardly tapering sidewall of said enclosure is maintained;
   fluid communicating means interposed between said cup-like portion and said tray whereby fluid may travel therebetween;
   snap-lock means releasably coupling said tray to said cup-like portion;
   said snap-lock means includes a plurality of openings provided in said annular wall in fixed spaced-apart relationship with respect to each other;
   a plurality of projections upwardly and inwardly extending from the bottom of said tray and of lesser diameter than said plurality of openings so that a snap-lock relationship exists when said projections are mated and in registry with said openings;
   said fluid communication means comprises said openings in said annular wall;
   said openings being of larger size than the size of said projections snap-locking with said cup-like portion and said tray for aligning said projections with respect to said openings;
   locator means cooperating between said cup-like portion and said tray for aligning said projections with respect to said snap-lock and drainage openings;
   said locator means includes a center frustro-conical projection extending upwardly from the bottom of said tray; and
   a hole provided in said cup-like portion bottom for insertably receiving said tray upward porjection whereby said tray can be rotated relative to said cup-like portion about said projection inserted in said hole for locating said snap-lock projections with respect to cooperating ones of said snap-lock and drainage openings.

* * * * *